Patented Aug. 24, 1937

2,090,808

UNITED STATES PATENT OFFICE 2,090,808

ACTIVATION OF HYDROXY-CELLULOSE ETHERS

George A. Richter, Berlin, N. H., assignor to Brown Company, Berlin, N. H., a corporation of Maine No Drawing. Application February 10, 1934
Serial No. 710,731

7 Claims. (Cl. 260—152)

This invention relates to the activation of hydroxy-cellulose ethers, more particularly for the purpose of causing them to dissolve more readily and completely in caustic soda solutions to form a syrup or solution of the ethers. Such a syrup may then be used for such purposes as making films, filaments, etc., and coating and/or impregnating paper, cloth, or other fabrics, a suitable and regenerating or setting reagent, such as a sulphuric acid solution of sodium sulphate, serving to regenerate the ether from the syrup.

After cellulose has been etherified to form the hydroxy-cellulose ethers, it may be difficult to dissolve such ethers at the desired rate and to the desired extent in the caustic soda solutions in which they are supposed to be soluble. It is for this reason that such ethers may have to be activated or peptized for the dissolving operation. One important way of activating or peptizing such ethers consists in freezing them in the presence of caustic soda solution and thawing out the mixture. In such way, it has been found possible to dissolve in caustic soda solutions of, say, 7% to 8% strength, about 7% to 8% of hydroxy-cellulose ether, and thereby to arrive at syrups or solutions of the desired fluidity and other characteristics for forming into films, filaments, etc. Even in such case, however, the syrups or solutions of the ether invariably have a haziness or turbidity that arises from fibers or fiber fragments that are resistant to the dissolving action of the caustic soda solution.

There are various factors that affect the solubility of the hydroxy-cellulose ethers in alkaline solutions and more particularly in caustic soda solutions of, say, 7% to 8% strength. For instance, the solubility of the hydroxy ethyl ether of cellulose depends upon the amount of ethylene oxide used in its preparation. So, too, when mercerized cellulose of low solution viscosity is employed as the raw material for etherification and/or when a comparatively high percentage of ethylene oxide or other etherifying agent is employed, the resulting ethers dissolve more readily and completely in caustic soda solutions. In fact, the step of activating by freezing a mixture of cellulose ether and caustic soda solution was developed for the purpose of causing a solution of those ethers that do not dissolve readily by mere mixing with a caustic soda solution, as is true in the case of the hydroxy ethyl ethers of cellulose that are prepared through the use of only a comparatively small percentage of ethylene oxide as the etherifying agent. Thus, it is impossible to dissolve a hydroxy ethyl cellulose ether that has been prepared with, say, about 10% ethylene oxide, based on the weight of cellulose, in a 7% to 8% caustic soda solution without putting the mixture through freezing and thawing steps. On the other hand, a similar ether made with a usage of about 50% or more ethylene oxide, based on the weight of cellulose, dissolves fairly well in a similar caustic soda solution without freezing and thawing or otherwise activating the mixture.

I have found that hydroxy-cellulose ethers may be activated greatly for solution if they are reduced from the fibrous condition which they possess after etherification to suitably pulverulent form, preferably to a powder not exceeding about 100 mesh, although even a 40-mesh powder makes for greatly improved results. While not limited thereto, the value of mechanically pulverizing the hydroxy-cellulose ethers obtains particularily in those cases where etherification has been accomplished with a comparatively small usage of etherifying agent, say, only about 10% of ethylene oxide, based on the weight of cellulose, to produce ethers that are difficultly soluble in fibrous form in caustic soda or equivalent solutions of alkali. The reduction of the fibrous hydroxy-cellulose ether can be performed to best advantage while the ether is in substantially dry condition, as in a ball mill, the reduced ether preferably being put through a screening operation designed to exclude powder particles of a size incapable of passing through a screen of about 100-mesh. The dry powder is an excellent form in which to ship the ether to users who desire to apply a solution of the ether as a coating and/or impregnating material to paper, cloth, or other fabric, as the powdered ether is stable and dissolves more rapidly and completely in caustic soda solutions than does the fibrous ether. The step of pulverization may be followed to good advantage, if desired, by the practice of freezing a mixture of the powdered ether and caustic soda solution and thawing out the mixture, as it is possible thereby to facilitate a solution of the ether and to enhance the clarity, sparkle, and other qualities of the resulting ether solution. The activation of the powdered ether by freezing and thawing it in admixture with the caustic soda solution in which it is to be dissolved, although unnecessary in those cases where the ether has been prepared with a comparatively high usage of etherifying agent, is advantageous in those instances when the ether has been prepared with a comparatively low usage of etherifying agent, say, only about 10% of ethylene oxide, based on the weight of cellulose.

While not limited thereto, I shall now describe with particularity the application of the principles of my invention in producing a powdered hydroxy ethyl ether of cellulose and a solution of such powdered ether.

Any suitable form of cellulose, such as refined wood pulp or cotton linters, may be used as raw material. It is preferable that the wood pulp or cotton linters be of high alpha cellulose content and low solution viscosity such as results from the action of a mercerizing liquor on the cellulose coupled with ageing, as such cellulose lends itself better to etherification and yields an hydroxy ether of better characteristics. The cellulose fiber may be moistened with water so as to contain about 50% to 60% by weight of fiber and mixed with a small amount of suitable catalyzer of etherification, say, 3% of pyridine, or 1% of caustic soda, based on the weight of fiber. The fiber is then exposed to the action of ethylene oxide vapor while kept in an autoclave, the reaction temperature being kept at about 40° to 50° C. as 10% to 20% of the ethylene oxide, based on the weight of the fiber, is progressively fed into the autoclave and is consumed by reaction with the fiber to form the hydroxy-ethyl ether of cellulose. During the reaction, it is preferable to mix or tumble the cellulose fiber so as to expose fresh fiber surfaces to the action of the ethylene oxide and thereby ensure substantially uniform etherification.

The etherified fibrous mass may then be washed, if desired, to remove the catalyst of the etherifying reaction. In any event, it is preferably dried before it is reduced to a particle size finer than about 100-mesh. The pulverization of the dried cellulose ether may be carried out in a ball mill for the necessary period of time and the powdered batch put through a sieve of about 100 or finer mesh to exclude undesirably coarse particles. Before dissolving the powdered cellulose ether, it is preferable to activate it further by mixing it with a caustic soda solution of about 7% to 8% strength and then thawing out the mixture, under which conditions the solution of about 7% to 8% of the ether to form an ether syrup of the desired qualities presents little difficulty. The syrup may be used for the various purposes already indicated.

It is possible to prepare powdered hydroxy-cellulose ethers by performing the step of pulverization at other stages of the process. Thus, pulverization to the degree of fineness already noted may be accomplished on the cellulose fiber before it is etherified, in which case one enjoys the advantage of quicker and more uniform etherification. On the other hand, it is more difficult to powder the unetherified fiber and to wash the powdered reaction product when washing is desirable. When mercerized cellulose is put through etherification, it is preferable to powder the cellulose fiber after mercerization rather than before mercerization, as mercerized fiber lends itself more easily to pulverization and can be pulverized even in the presence of water on account of its non-hydratable character. On the other hand, the etherified fiber, particularly in dry condition, is especially friable or crumbly, being even more so than mercerized cellulose, wherefore, I prefer to pulverize the etherified fiber in such condition for this reason as well as to avoid the difficulty incident to the washing of an etherified powder.

In the case more particularly of those hydroxy-cellulose ethers that have been prepared through the usage of a comparatively small amount of etherifying agent, say, only about 10% of ethylene oxide, based on the weight of cellulose, the pulverization of the ether may be accomplished in water even though, as already indicated, it may be preferable to do so in the absence of water. On the other hand, those ethers that have been prepared through the use of a comparatively large amount of etherifying agent, say, about 50% or more of ethylene oxide, based on the weight of cellulose, tend to become swollen or hydrated when ground or pulverized in water. When grinding or pulverization of such ethers is performed in an aqueous medium, it is well to keep such medium distinctly on the acid side, say, at a pH value not greater than about 4.5, since otherwise the etherified fibers tend to become swollen or hydrated and thus to interfere with the grinding or pulverizing action.

I claim:

1. A process which comprises etherifying cellulose fibers with ethylene oxide to form hydroxy ethyl ether of cellulose, grinding such etherified cellulose fibers to a pulverulent condition in an aqueous medium distinctly on the acid side, and dissolving the powdered ether in an alkaline aqueous solution.

2. A process which comprises etherifying cellulose fibers with ethylene oxide to form hydroxy ethyl ether of cellulose, grinding such etherified cellulose fibers to a pulverulent condition in an aqueous medium whose pH value is not greater than about 4.5, and dissolving the powdered ether in an alkaline aqueous solution.

3. A process of preparing a solution of hydroxy-cellulose ether, which comprises etherifying cellulose fiber with about 10% to 20% of etherifying agent to form a hydroxy-cellulose ether, mechanically reducing the resulting etherified fiber to fiber fragments of a particle size not exceeding about 40-mesh as a maximum, thereby activating the ether for substantially complete dissolution in an alkaline aqueous solution, and dissolving the ether particles substantially completely in an alkaline aqueous solution.

4. A process of preparing a solution of hydroxy ethyl ether of cellulose, which comprises etherifying cellulose fiber with about 10% to 20% of ethylene oxide, based on the weight of cellulose fiber, to form hydroxy ethyl ether of cellulose, mechanically reducing such resulting etherified fiber to fiber fragments of a particle size not exceeding about 40-mesh as a maximum, thereby activating the ether for substantially complete dissolution in an alkaline aqueous solution, and dissolving the ether particles substantially completely in an alkaline aqueous solution.

5. A process of preparing a solution of hydroxy-cellulose ether, which comprises etherifying cellulose fiber in the presence of alkali to form hydroxy-cellulose ether, washing the etherified fibers, grinding them to a powder sufficiently fine to be substantially completely dissolved in an alkaline aqueous solution, and dissolving the powdered ether substantially completely in an alkaline aqueous solution.

6. A process of preparing a solution of hydroxy-cellulose ether, which comprises etherifying cellulose fiber in the presence of alkali to form hydroxy-cellulose ether, washing the etherified fibers, drying them, grinding them in a dry condition to a powder sufficiently fine to be substantially completely dissolved in an alkaline aqueous solution, and dissolving the powdered ether substantially completely in an alkaline aqueous solution.

7. A process which comprises etherifying cellulose fiber to form hydroxy-cellulose ether, grinding the etherified fibers to a pulverulent condition in the presence of an aqueous medium selected from a class consisting of water and an aqueous medium distinctly on the acid side, and dissolving the powdered ether in an alkaline aqueous solution.

GEORGE A. RICHTER.